United States Patent [19]

Okuyama et al.

[11] Patent Number: 5,037,128
[45] Date of Patent: Aug. 6, 1991

[54] ACTIVE SUSPENSION SYSTEM WITH ENHANCED STABILITY

[75] Inventors: Yuji Okuyama; Kunio Katada, both of Tochigi; Katsuya Kii, Nara; Takashi Yonezawa, Tochigi, all of Japan

[73] Assignee: Nissan Motor Company, Limited, Japan

[21] Appl. No.: 559,950

[22] Filed: Jul. 31, 1990

[30] Foreign Application Priority Data

Jul. 31, 1989 [JP] Japan .................. 1-199117

[51] Int. Cl.$^5$ .................................. B60G 21/00
[52] U.S. Cl. .................................. 280/703; 280/707; 280/772
[58] Field of Search ............... 280/707, 703, 772; 364/426

[56] References Cited

U.S. PATENT DOCUMENTS

| | | | |
|---|---|---|---|
| 4,586,728 | 5/1986 | Tokunaga et al. | 280/703 |
| 4,625,992 | 12/1986 | Tanaka et al. | 280/703 |
| 4,691,284 | 9/1987 | Izumi et al. | 280/703 |
| 4,702,490 | 10/1987 | Yamaguchi et al. | 280/707 |
| 4,872,701 | 10/1989 | Akatsu et al. | 280/703 |

FOREIGN PATENT DOCUMENTS

| | | |
|---|---|---|
| 0249209 | 6/1987 | European Pat. Off. . |
| 0249227 | 6/1987 | European Pat. Off. . |
| 0283004 | 3/1988 | European Pat. Off. . |
| 0284053 | 3/1988 | European Pat. Off. . |
| 0285153 | 3/1988 | European Pat. Off. . |
| 0286072 | 4/1988 | European Pat. Off. . |
| 63-227411 | 9/1988 | Japan . |

*Primary Examiner*—Kenneth R. Rice
*Attorney, Agent, or Firm*—Lowe, Price, LeBlanc & Becker

[57] ABSTRACT

An active suspension system employs a vertical acceleration sensor for monitoring vertical acceleration exerted on the vehicular body at an orientation where a suspension system is provided, to produce a vertical acceleration indicative signal. The system derives a vertical displacement speed on the basis of the vertical acceleration indicative signal. A suspension control command for stabilizing vertical vibration is thus derived on the basis of the vertical motion speed and a given gain. In order to facilitate satisfactorily high cornering stability, the system varies the gain for deriving the suspension control command depending upon a lateral acceleration exerted on the vehicular body.

14 Claims, 4 Drawing Sheets

ACTIVE SUSPENSION SYSTEM WITH ENHANCED STABILITY

BACKGROUND OF THE INVENTION

1. Field of the Invention

The present invention relates to an active suspension system for an automotive vehicle. More specifically, the invention relates to an active suspension system which can provide enhanced cornering stability with maintaining riding comfort.

2. Description of the Background Art

The co-pending U.S. patent application Ser. No. 169,201, filed on Mar. 16, 1988, now U.S. Pat. No. 4,865,347, corresponding European Patent Application of which has been published under First Publication No. 02 83 004, discloses an actively controlled suspension system including an anti-roll control loop which is responsive to lateral acceleration to be exerted on a vehicle, to adjust suspension characteristics. The control loop employed suspension system is variable of responsive characteristics to vehicular rolling depending upon the vehicle speed for varying anti-rolling suspension control characteristics. In a range of the vehicle speed, in which the greater loop gain of the control loop, causes significant and unacceptable level of self-induced lateral vibration, the gain is varied to be the smaller value than that in other vehicle speed range. Namely, since the greater gain may affect for causing self-induced lateral vibration in substantially low vehicle speed range, the gain main be adjusted to be smaller while the vehicle speed is lower than a given value.

The co-pending U.S. patent application Ser. No. 176,246, filed on Mar. 31, 1988, now U.S. Pat. No. 4,888,696, corresponding European Patent Application of which has been published under First Publication No. 02 85 153, discloses an actively controlled automotive suspension system employing a factor representative of self-induced attitude change creative factor as a correction factor in attitude regulating suspension control. Suspension characteristics is controlled on the basis of rolling and/or pitching energy representing parameter. The correction factor representative of self-induced attitude change is derived on the basis of vehicular attitude change velocity for canceling the self-induced rolling and/or pitching. By canceling the self-induced rolling and/or pitching creative component from the rolling and/or pitching acceleration factor, higher rolling and/or pitching response characteristics can be provided so as to satisfactory high driving stability and riding comfort.

The co-pending U.S. patent application Ser. No. 172,419, filed on Mar. 24, 1988, now U.S. Pat. No. 4,872,701, corresponding European patent Application of which has been published under First publication No. 02 84 053, discloses a suspension control system for an automotive vehicle which is designed for effectively suppressing pitching motion and whereby regulating vehicular attitude. The suspension control system monitors pitching moment to be exerted on the vehicle for adjusting response characteristics in pitching-suppressive control depending upon the magnitude of the pitching moment to be exerted. The suspension control system adjust the response characteristics of the front and rear suspensions independently of each other according to preset pitching-suppressive control coefficients respectively for the front and rear suspensions, which are set depending upon the suspension characteristics and/or suspension geometry of the vehicle, to which the suspension control system is to be applied.

These prior proposed co-pending applications comprises vertical acceleration sensors for monitoring vertical acceleration exerted on the vehicular body at the orientation where respective suspension systems are provided. Respective vertical acceleration indicative signals are integrated for deriving magnitude of relative displacement between the vehicular body and the corresponding vehicular wheels.

On the other hand, Japanese Patent First (unexamined) publication (Tokkai) Showa 63-227411 discloses another active suspension system, in which speed of relative motion between the vehicle body and the corresponding vehicular wheel for deriving control command for damping vertical vibration. The system further employs a longitudinal acceleration sensor and a lateral acceleration sensor for monitoring magnitudes of pitching and rolling for stabilizing vehicular body attitude.

In such system, it is preferred to provide softer damping characteristics for vertical vibration on a smooth straight road for providing satisfactorily high level riding comfort. On the other hand, in case of cornering on undulated road, softer damping characteristics may lead vehicular cornering stability due to lack of vibration damping force.

SUMMARY OF THE INVENTION

Therefore, it is an object of the present invention to provide an active suspension system which can provide sufficiently high cornering stability without causing degradation of the riding comfort.

In order to achieve the object set forth above, an active suspension system, according to the present invention, employs a vertical acceleration sensor for monitoring vertical acceleration exerted on the vehicular body at an orientation where a suspension system is provided, to produce a vertical acceleration indicative signal. The system derives a vertical displacement speed on the basis of the vertical acceleration indicative signal. A suspension control command for stabilizing vertical vibration is thus derived on the basis of the vertical motion speed and a given gain. In order to facilitate satisfactorily high cornering stability, the system varies the gain for deriving the suspension control command depending upon a lateral acceleration exerted on the vehicular body.

According to one aspect of the invention, an active suspension system comprises:

a suspension system disposed between a vehicular body and a road wheel, the suspension system including a variable pressure working chamber for generating damping force against relative displacement between the vehicular body and the road wheel;

a hydraulic system connected to the working chamber for adjusting fluid pressure therein, the hydraulic system including a pressure control valve for controlling introduction and draining of pressurized fluid in the working chamber for adjusting the fluid pressure in the working chamber;

a first sensor for monitoring vertical acceleration at the suspension system for producing a first acceleration indicative data;

a second sensor for monitoring acceleration exerted in a direction transverse to vertical axis for producing a second acceleration indicative data; and a control means for receiving the first acceleration indicative data for deriving a vertical speed indicative data, deriving a control gain on the basis of the second acceleration indicative data, deriving a desired fluid pressure in the working chamber on the basis of the vertical speed indicative data and the control gain, and deriving a control signal for controlling position of the pressure control valve for adjusting the fluid pressure in the working chamber toward the desired fluid pressure.

The second sensor may monitor a lateral acceleration for producing the second acceleration indicative data representative thereof. The control means may increase the control gain according to increasing of the second acceleration signal. The control means may maintain the control gain constant at a predetermined minimum value when the second acceleration signal is maintained smaller than a predetermined value.

Preferably, the active suspension system may further comprise a third sensor for monitoring vehicle speed to produce a vehicle speed data, and the control means varies increasing rate of the control gain according to increasing of the second acceleration data, depending upon the vehicle speed data. The control means may be set a plurality of variation characteristics of the control gain and selects one of the variation characteristics depending upon the vehicle speed data.

According to another aspect of the invention, an active suspension system comprises:

a suspension system disposed between a vehicular body and a road wheel, the suspension system including a variable pressure working chamber for generating damping force against relative displacement between the vehicular body and the road wheel;

a hydraulic system connected to the working chamber for adjusting fluid pressure therein, the hydraulic system including a pressure control valve for controlling introduction and draining of pressurized fluid in the working chamber for adjusting the fluid pressure in the working chamber;

a first sensor for monitoring vertical acceleration at the suspension system for producing a first acceleration indicative data;

a second sensor for monitoring acceleration exerted in a direction transverse to vertical axis for producing a second acceleration indicative data; and a control means for receiving the first acceleration indicative data for deriving a vertical speed indicative data, deriving a control gain on the basis of the second acceleration indicative data, deriving a vertical motion dependent pressure adjusting value representative of offset of pressure from a predetermined neutral pressure, and deriving a control signal for controlling position of the pressure control valve on the basis of the vertical motion dependent pressure adjusting value.

The control means may further derive an attitude change dependent pressure adjusting value and derives the control signal on the basis of sum of the vertical motion dependent pressure adjusting value and the attitude change dependent pressure adjusting value. The second sensor may monitor a lateral acceleration for producing the second acceleration indicative data representative thereof, and the control means derives a first attitude change dependent pressure adjusting value depending upon the magnitude of lateral acceleration. The active suspension system may further comprise a third sensor for monitoring longitudinal acceleration for producing a third acceleration indicative data, the control means derives a second attitude change dependent pressure adjusting value depending upon longitudinal acceleration, and the control signal on the basis of a sum of the vertical motion dependent pressure adjusting value, the first attitude change dependent pressure adjusting value and the second attitude change dependent pressure adjusting value.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
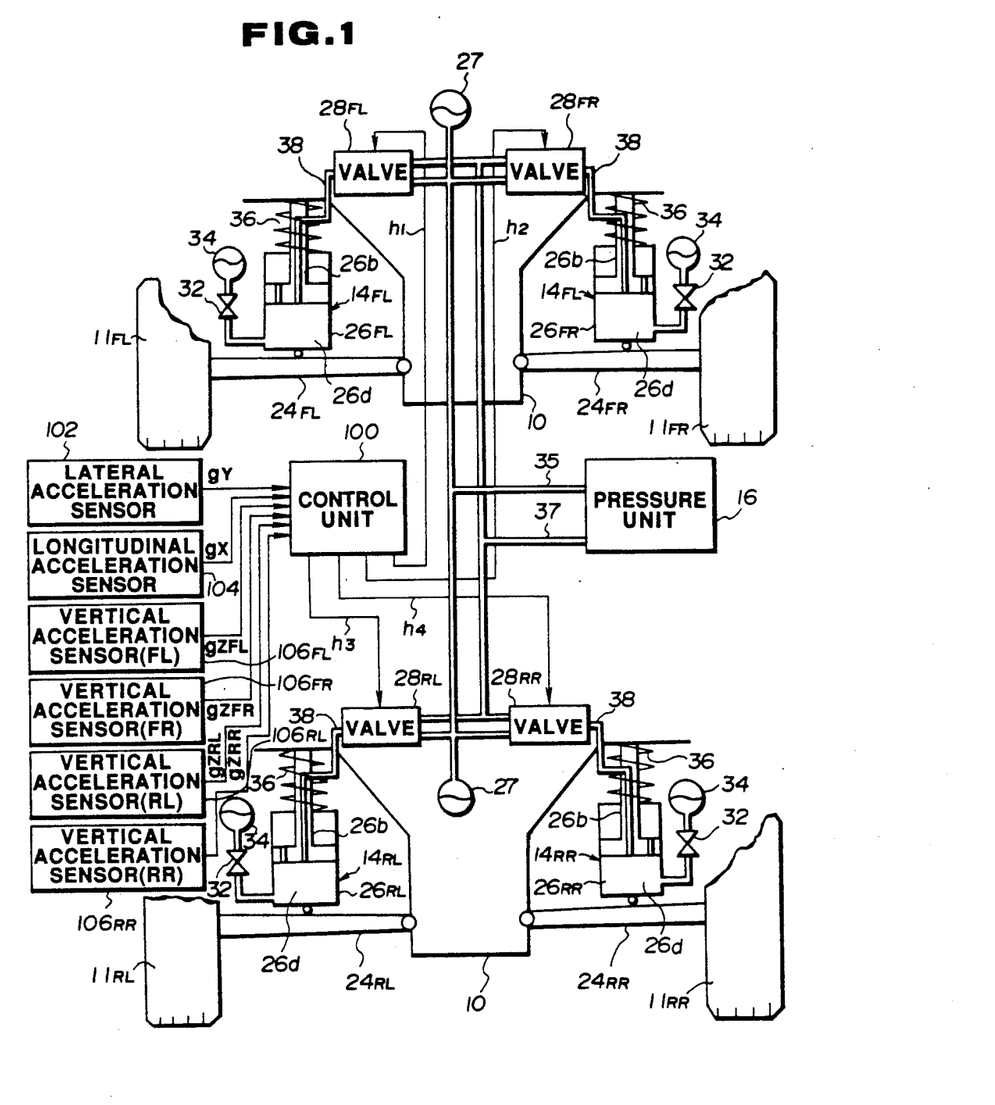
FIG. 1 is a diagrammatic illustration of the preferred embodiment of an active suspension control system, according to the present invention.

Referring now to the drawings, particularly to FIG. 1, the preferred embodiment of an active suspension system, according to the present invention, is designed to generally perform suspension control for regulating vehicular height level and vehicular attitude by suppressing relative displacement between a vehicular body 10 and suspension members 24FL, 24FR, 24RL and 24RR provided in front-left, front-right, rear-left and rear-right suspension mechanism 14FL, 14FR, 14RL and 14RR and rotatably supporting front-left, front-right. rear-left and rear-right wheels 11FL, 11FR, 11RL and 11RR. The suspension member will be hereafter represented by the reference numeral "24" as generally referred to. Similarly, the suspension mechanism as generally referred to will be hereafter represented by the reference numeral "14". Respective front-left, front-right, rear-left and rear-right suspension mechanisms 14FL, 14FR, 14RL and 14RR have hydraulic cylinders 26FL, 26FR, 26RL and 26RR which will be represented by the reference numeral "26" as generally referred to.

Each of the hydraulic cylinder 26 is disposed between the vehicular body 10 and the suspension member 24 to produce a damping force for suppressing relative displacement between the vehicular body and the suspension member. The hydraulic cylinder 26 generally comprises an essentially enclosed cylindrical cylinder body 26a defining therein an enclosed chamber. A thrusting piston 26c is thrustingly and slidably disposed within the enclosed chamber of the hydraulic cylinder 26 for defining in the latter a working chamber 26d and a reference pressure chamber 26e. The working chamber 26d may be communicated with the reference pressure chamber 26e via an orifice formed through the piston for fluid communication therebetween in an substantially restricted amount. The piston 26c is connected to the associated one of suspension member 24 via a piston rod 26b. A suspension coil spring 36 employed in the shown type of the suspension system is not required a resilient force in a magnitude required in the ordinary suspension system and only required the resilient force necessary for maintaining the vehicular body about the suspension member.

The working chamber 26d of the hydraulic cylinder 26 is connected one of pressure control valves 28FL, 28FR, 28RL and 28RR via a pressure control line 38. The pressure control valve 28FL, 28FR, 28RL and 28RR will be hereafter represented by the reference numeral "28" as generally referred to. The pressure control valve 28 is, in turn, connected to a pressure source unit 16 via a supply line 35 and a drain line 37. A branch circuit is provided for connecting the pressure control line 38 to a pressure accumulator 34 via a flow restricting means, such as an orifice 32. Another pressure accumulator 18 is provided in the supply line 35 for accumulating the excessive pressure generated in the pressure source unit 16.

The pressure control valves 28 comprise, though it is not clearly shown in FIG. 1, electrically or electromagnetically operable actuators, such as a proportioning solenoids. The hydraulic cylinder 26 and the pressure control valve 28 may be of any suitable constructions for adjusting damping characteristics with sufficiently high response. Typical constructions of the hydraulic cylinder 26 and the pressure control valve 28 have been disclosed in the following prior applications or publications:

U.S. patent application Ser. No. 052,934, filed on May 22, 1989, now U.S. Pat. No. 4,903,983;

U.S. patent application Ser. No. 059,888, filed on June 9, 1987, now abandoned, corresponding European Patent Application has been published as First Publication No. 02 49 209;

U.S. patent application Ser. No. 060,856, filed on June 12, 1987, now abandoned, corresponding European patent Application has been published as First Publication No. 02 49 227;

U.S. patent application Ser. No. 060,909, filed on June 12, 1987, now U.S. Pat. No. 4,909,534;

U.S. patent application Ser. No. 060,911, filed on June 12, 1987, now U.S. Pat. No. 4,801,155;

U.S. patent application Ser. No. 176,246, filed on Mar. 31, 1988, now U.S. Pat. No. 4,888,696, the corresponding European Patent Application has been published as First publication No. 02 85 153;

U.S. patent application Ser. No. 178,066, filed on Apr. 5, 1988, now U.S. Pat. No. 4,848,790, the corresponding European Patent Application has been published as First Publication No. 02 86 072;

U.S. patent application Ser. No. 167,835, filed on Mar. 4, 1988, now U.S. Pat. No. 4,865,348;

U.S. patent application Ser. No. 244,008, filed on Sept. 14, 1988, now U.S. Pat. No. 4,938,499;

U.S. patent application Ser. No. 255,560, filed on Oct. 11, 1988, now U.S. Pat. No. 4,943,084;

U.S. patent application Ser. No. 266,763, filed on Nov. 3, 1988, now U.S. Pat. No. 4,967,360;

U.S. patent application Ser. No. 261,870, filed on Oct. 25, 1988, now pending;

U.S. patent application Ser. No. 263,764, filed on Oct. 28, 1988, now U.S. Pat. No. 4,905,152;

U.S. patent application Ser. No. 277,376, filed on Nov. 29, 1988, now U.S. Pat. No. 4,919,440;

U.S. patent application Ser. No. 303,338, filed on Jan. 26, 1989, now pending;

U.S. patent application Ser. No. 310,130, filed on Mar. 22, 1989, now U.S. Pat. No. 4,973,079;

U.S. patent application Ser. No. 327,460, filed on Mar. 22, 1989, now U.S. Pat. No. 4,911,469;

U.S. patent application Ser. No. 303,339, filed on Jan. 26, 1989, now U.S. Pat. No. 4,948,165;

U.S. patent application Ser. No. 331,602, filed on Mar. 31, 1989, now U.S. Pat. No. 4,911,468;

U.S. patent application Ser. No. 331,653, filed Mar. 31, 1989, now U.S. Pat. No. 4,911,470;

U.S. patent application Ser. No. 364,477, filed on June 12, 1989, now pending;

U.S. patent application Ser. No. 365,468, filed on June 12, 1989, now pending.

The disclosures of the above-identified co-pending U.S. Patent Applications and corresponding publications are herein incorporated by reference for the sake of disclosure.

The actuators are connected to a microprocessor based control unit 100. The control unit 100 is connected to a lateral acceleration sensor 102, a longitudinal acceleration sensor 104, vertical acceleration sensors 106FL, 106FR, 106RL and 106RR. As is well known, the lateral acceleration sensor 102 monitors a lateral acceleration exerted on the vehicular body to produce a lateral acceleration indicative signal $g_y$. Similarly, the longitudinal acceleration sensor 104 monitors a longitudinal acceleration exerted on the vehicle body to produce a longitudinal acceleration indicative signal $g_x$. The vertical acceleration sensors 106FL, 106FR, 106RL and 106RR are provided at respective positions where front-left, front-right, rear-left and rear-right suspension mechanisms 14FL, 14FR, 14RL and 14RR are provided. The vertical acceleration sensors 106FL, 106FR, 106RL and 106RR monitor vertical acceleration at the associated suspension mechanisms 14FL, 14FR, 14RL and 14RR to produce front-left, front-right, rear-left and rear-right vertical acceleration indicative signals $g_{zFL}$, $g_{zFR}$, $g_{zRL}$ and $g_{zRR}$.

Figure 2:
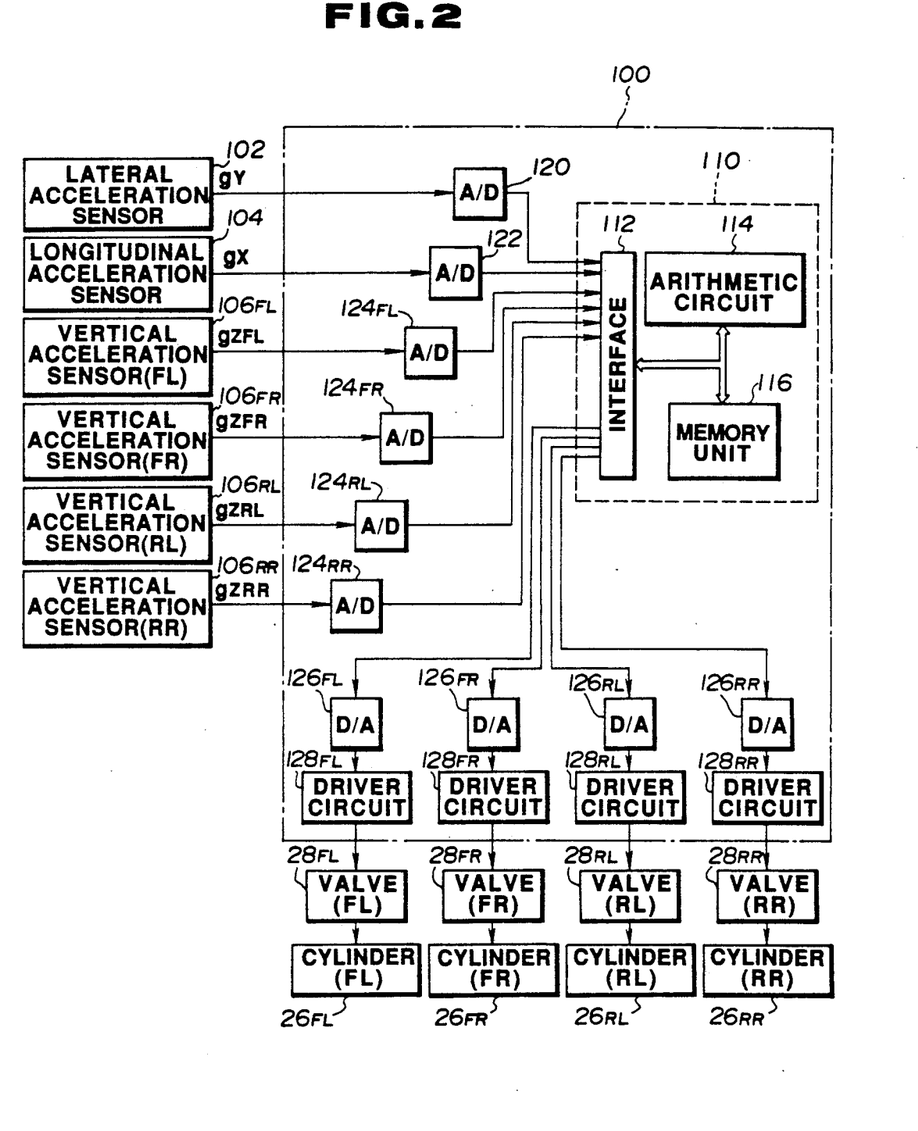
FIG. 2 is a block diagram showing a preferred construction of a control system associated with the preferred embodiment of the active suspension system of FIG. 1.

As shown in FIG. 2, the control unit 100 comprises a microprocessor 110 which includes an input/output interface 112, an arithmetic circuit 114 and a memory unit 116. The lateral acceleration sensor 102 is connected to the input/output interface 112 of the microprocessor 110 via an analog-to-digital (A/D) interface 120. The A/D converter 120 converts the analog form lateral acceleration indicative signal $g_y$ into a lateral acceleration indicative digital signal. On the other hand, the longitudinal acceleration sensor 104 is connected to the input/output interface 112 via an A/D converter 122. The A/D converter 122 converts the analog form longitudinal acceleration indicative signal $g_x$ into a digital form longitudinal acceleration indicative digital signal. Also, respective of the front-left, front-right, rear-left and rear-right vertical acceleration sensors 106FL, 106FR, 106RL and 106RR are connected to the input/output interface 112 via A/D converters 124FL, 124FR, 124RL and 124RR. The A/D converters 124FL, 124FR, 124RL and 124RR converts analog form front-left, front-right, rear-left and rear-right vertical acceleration indicative signals $g_{zFL}$, $g_{zFR}$, $g_{zRL}$ and $g_{zRR}$ into digital form vertical acceleration indicative digital signals. The microprocessor 110 processes the lateral acceleration indicative digital signals, the longitudinal acceleration digital signals and the front-left, front-right, rear-left and rear-right vertical acceleration indicative digital signals for deriving front-left, front-right, rear-left and rear-right suspension control commands $S_{FL}$, $S_{FR}$, $S_{RL}$ and $S_{RR}$. The suspension control commands $S_{FL}$, $S_{FR}$, $S_{RL}$ and $S_{RR}$ are current signal having current level corresponding to the magnitude of adjustment of the fluid pressure.

Figure 3:
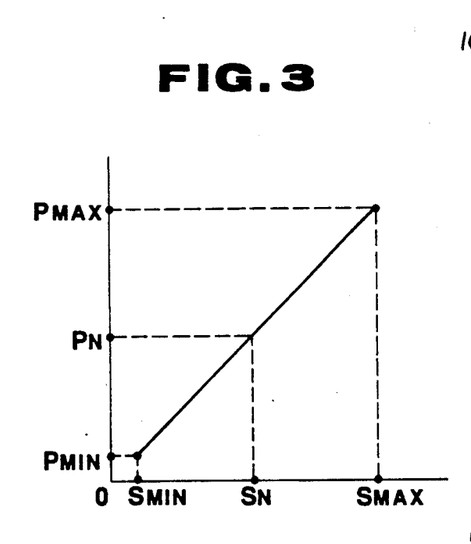
FIG. 3 is a chart showing relationship between current level of a suspension control command and fluid pressure in a working chamber in the preferred embodiment of the active suspension system.

As can be seen from FIG. 3, the current value of the suspension control command is variable between a predetermined minimum value $S_{MIN}$ and a predetermined maximum value $S_{MAX}$. The fluid pressure becomes minimum $P_{MIN}$ at the minimum value $S_{MIN}$ of the suspension control command and becomes maximum $P_{MAX}$ at the maximum value $S_{MAX}$ of the suspension control command. The minimum value $S_{MIN}$ of the suspension control command is set in view of noise possible superimposed on the suspension control current. As can be seen, the fluid pressure in the working chamber 26d of the hydraulic cylinder 26 linearly varies between the maximum pressure level $P_{MAX}$ and the minimum pressure level $P_{MIN}$ across a predetermined neutral pressure $P_N$ corresponding to the current level $S_N$.

Figure 4:
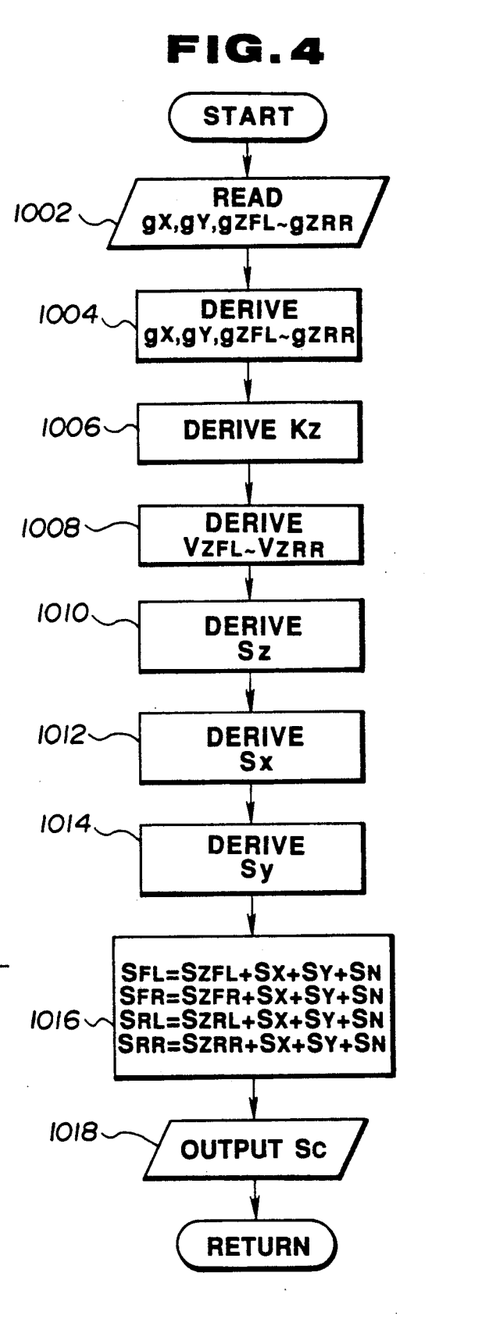
FIG. 4 is a flowchart showing a routine for deriving the suspension control command.

FIG. 4 shows a routine for deriving the suspension control command to be executed by the microprocessor 110 in the control unit 100. The shown routine is executed every predetermined timing, e.g. every 20 msec. Immediately after starting execution, the lateral acceleration indicative digital signal $g_y$, the longitudinal acceleration indicative digital signal $g_x$ and the front-left, front-right, rear-left and rear-right acceleration indicative digital signals $g_{zFL}$, $g_{zFR}$, $g_{zRL}$ and $g_{zRR}$ are read out at a step 1002. Based on the lateral acceleration indicative digital signal $g_y$, the longitudinal acceleration indicative digital signal $g_x$ and the front-left, front-right, rear-left and rear-right acceleration indicative digital signals $g_{zFL}$, $g_{zFR}$, $g_{zRL}$ and $g_{zRR}$ read at the step 1002, a lateral acceleration data $G_y$, a longitudinal acceleration data $G_x$ and front-left, front-right, rear-left and rear-right vertical acceleration data $G_{zFL}$, $G_{zFR}$, $G_{zRL}$ and $G_{zRR}$ are derived at a step 1004.

Figure 5:
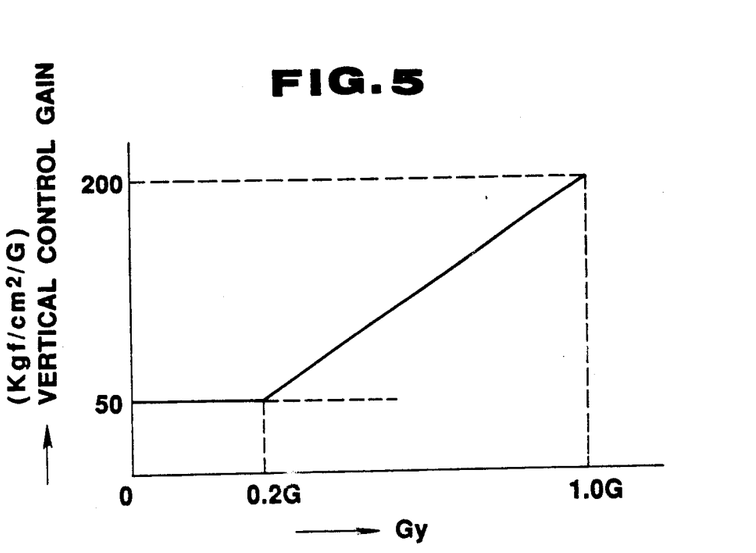
FIG. 5 is a chart showing relationship between control gain and lateral acceleration.

Then, at a step 1006, a control gain Kz is derived on the basis of the lateral acceleration data $G_y$. In practice, the control gain Kz is derived by table look-up against a table having preliminarily stored data realizing the characteristics as illustrated in FIG. 5. Namely, as seen from FIG. 5, the control gain Kz is maintained constant at a value of 50 kgf/cm$^2$/G while the lateral acceleration as represented by the lateral acceleration data $G_y$ is maintained smaller than or equal to 0.2G. On the other hand, when the lateral acceleration becomes greater than 0.2G, the control gain Kz increases in linearly proportional to increasing of the lateral acceleration.

Thereafter, at a step 1008, front-left, front-right, rear-left and rear-right vertical motion speed data $V_{zFL}$, $V_{zFR}$, $V_{zRL}$ and $V_{zRR}$ are derived by integrating the front-left, front-right, rear-left and rear-right vertical acceleration data $G_{zFL}$, $G_{zFR}$, $G_{zRL}$ and $G_{zRR}$ over a predetermined period of time. Thereafter, vertical motion speed dependent control values $S_{zFL}$, $S_{zFR}$, $S_{zRL}$ and $S_{zRR}$ are derived on the basis of the front-left, front-right, rear-left and rear-right vertical motion speed data $V_{zFL}$, $V_{zFR}$, $V_{zRL}$ and $V_{zRR}$, at a step 1010. In practice, the vertical motion speed dependent suspension control values $S_{zFL}$, $S_{zFR}$, $S_{zRL}$ and $S_{zRR}$ are derived by multiplying respective of the vertical motion speed data $V_{zFL}$, $V_{zFR}$, $V_{zRL}$ and $V_{zRR}$ with the control gain Kz derived at the step 1006.

At step 1012, an anti-pitching correction value $S_x$ is derived on the basis of the longitudinal acceleration data $G_x$. In practice, the anti-pitching correction value $S_x$ is calculated by multiplying the longitudinal acceleration data $G_x$ with a predetermined anti-pitching control gain $K_x$. Similarly, at a step 1014, an anti-rolling correction value $S_y$ is derived on the basis of the lateral acceleration data $G_y$. In practice, the anti-pitching correction value $S_y$ is calculated by multiplying the lateral acceleration data $G_y$ with a predetermined anti-pitching control gain $K_y$.

The manner of deriving the anti-pitching correction value $K_y$ and the anti-rolling correction values are well disclosed in the following co-pending U.S. patent applications Ser. Nos. 69,201, 176,246, and 172,419, set forth above. The disclosures of these copending U.S. patent application are herein incorporated by reference.

Then, the suspension control commands $S_{FL}$, $S_{FR}$, $S_{RL}$ and $S_{RR}$ are derived by the following equations, at a step 1016:

$$S_{FL} = S_{zFL} + S_x + S_y + S_N$$

$$S_{FR} = S_{zFR} + S_x + S_y + S_N$$

$$S_{RL} = S_{zRL} + S_x + S_y + S_N$$

$$S_{RR} = S_{zRR} + S_x + S_y + S_N$$

wherein $S_N$ is a predetermined height regulation control value, which can be a value for adjusting the vehicular height at neutral height position but can be set at any appropriate value. Thereafter, suspension control signals $S_C$ representative of respective of the suspension control command values $S_{FL}$, $S_{FR}$, $S_{RL}$ and $S_{RR}$ are output at a step 1018.

Assuming that the vehicle travels on a flat and smooth road at constant speed in straight, no vehicular attitude change is caused. Therefore, the lateral acceleration indicative signal value $g_y$, the longitudinal acceleration indicative signal value $g_x$ and the vertical acceleration indicative signal values $g_{zFL}$, $g_{zFR}$, $g_{zRL}$ and $g_{zRR}$ are maintained at zero (0). Therefore, all of the suspension control command values derived at the step 1016 become $S_N$. Therefore, the vehicular height level is maintained at the height level represented by the height regulation control value $S_N$. Here, assuming that the height regulation control value $S_N$ represents the neutral height level of the vehicular body, the fluid pressure in the working chambers 26d of respective hydraulic cylinders 26FL, 26FR, 26RL and 26RR are maintained at neutral pressure $P_N$.

When the vehicular wheels 11FL, 11FR, 11RL and 11RR pass over undulation on the road surface, the vibration component in a frequency range corresponding to the resonance band of the vehicular body, can be absorbed by absorbing fluid pressure variation in the hydraulic system including the pressure control valves 28FL, 28FR, 28RL and 28RR. Namely, absorption of the vibration frequency corresponding to the vehicular body resonance frequency range is performed by supplying line pressure through the supply port of the pressure control valve to the working chamber 26d or draining the fluid pressure in the working chamber from the drain port of the pressure control valve. On the other hand, the vibration component in a frequency range corresponding to the resonance frequency range of the road wheels, which frequency range is relatively high frequency range higher than that of the vehicular body resonance frequency range, is absorbed by the low pressure accumulators 34.

Upon cornering, lateral acceleration is induced due to centrifugal force for causing vehicular rolling. Then, the lateral acceleration as represented by the lateral acceleration indicative signal $g_y$ becomes other than zero. As can be seen, the lateral acceleration indicative signal $g_y$ has a polarity variable depending upon the direction of the lateral acceleration. In the shown embodiment, the polarity of the lateral acceleration indicative signal $g_y$ becomes positive in response to left-hand steering causing right-hand rolling and negative vis-a-vis.

Assuming that right-hand rolling is caused, the positive value of the lateral acceleration indicative signal $g_y$ is produced by the lateral acceleration sensor. As long as the lateral acceleration is maintained smaller than the predetermined value, e.g. 0.2G, the control gain $K_z$ derived at the step 1006, is maintained constant at minimum value. Therefore, since the control gain $K_z$ is maintained constant at minimum value, the vertical motion dependent height control values $S_z$ varies in a the minimum rare as defined by the control gain $K_z$. Therefore, at this condition, difference between the suspension control command values $S_{FL}$, $S_{FR}$, $S_{RL}$ and $S_{RR}$ and the height regulating control value $S_N$ are maintained at relatively small value for maintaining the fluid pressure in the working chambers of the hydraulic cylinders close to the neutral pressure $P_N$. Namely, in this case, since the rolling magnitude is small, the vertical acceleration induced at left and right sides of the vehicular body is small. Therefore, the vertical motion dependent control values $S_{zFL}$, $S_{zFR}$, $S_{zRL}$ and $S_{zRR}$ derived on the basis of the vertical motion speed $V_{zFL}$, $V_{zFR}$, $V_{zRL}$ and $V_{zRR}$ and the control gain $K_z$ at the step 1010 is maintained small. Also, the anti-rolling control value $S_y$ is maintained at small value. Therefore, the suspension control command values $S_{FR}$ and $S_{RR}$ for the outer side wheels with respect to the curve center cam be slightly greater than the height regulation control value $S_N$. Therefore, the fluid pressure in the working chambers 26d of the hydraulic cylinders 26FR and 26RR are slightly higher than the neutral pressure $P_N$. On the other hand, the suspension control command values $S_{FL}$ and $S_{RL}$ for the inner side wheels with respect to the curve center can be slightly smaller than the height regulation control value $S_N$. Therefore, the fluid pressure in the working chambers 26d of the hydraulic cylinders 26FL and 26RL are slightly higher than the neutral pressure $P_N$.

When the lateral acceleration to be exerted is relatively small to cause small magnitude of rolling motion, vertical displacement at left and right sides of the vehicular body is maintained relatively small. In such condition, since the vehicular cornering stability may not be affected by the vehicular motion, riding comfort with softer suspension characteristics is more important than cornering stability. As set forth, since the fluid pressures in respective of the working chambers are maintained close to the neutral pressure, satisfactorily soft suspension characteristics can be achieved.

Figure 6:
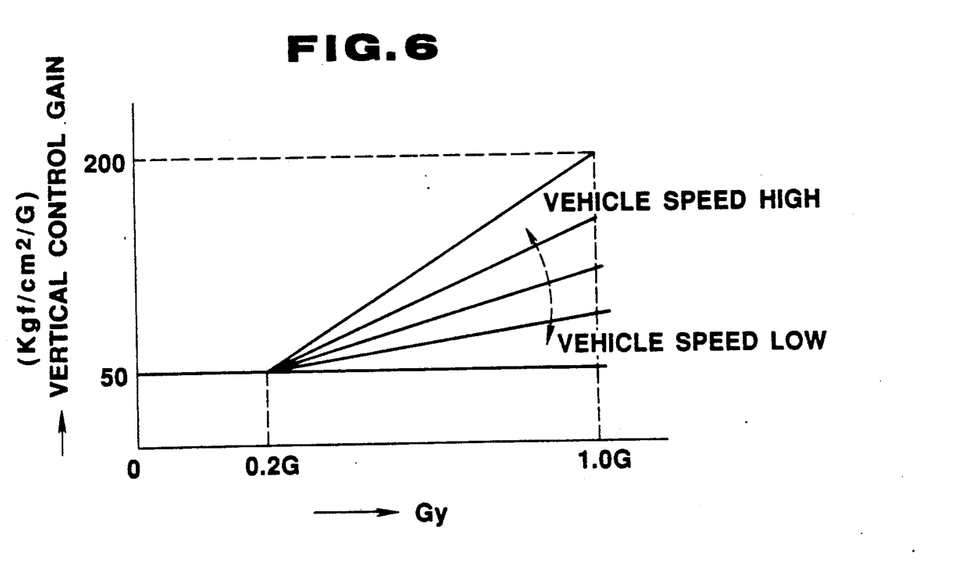
FIG. 6 is a chart similar to FIG. 5 but modified with employing vehicular speed as additional parameter.

On the other hand, when the lateral acceleration becomes greater than the predetermined speed, e.g. 0.2G, the control grain $K_z$ to be derived at the step 1006 becomes increased according to increasing of the lateral acceleration data $G_y$, as shown in FIG. 6. Therefore, the vertical motion dependent height control values $S_{zFL}$, $S_{zFR}$, $S_{zRL}$ and $S_{zRR}$ to be derived at the step 1010, varies at greater rate so that higher fluid pressure is established in the working chamber. Also, because of relatively greater value of the lateral acceleration data $G_y$, the anti-rolling control value $S_y$ becomes relatively great. As a result, harder suspension characteristics can be obtained at the out side wheels, i.e. right wheels, and softer suspension characteristics can be obtained at the inner side wheels, i.e. left wheels. Therefore, high level cornering stability can be achieved.

Similarly, anti-pitching control can be performed for maintaining the fluid pressure in the working chamber close to the neutral pressure when the pitching magnitude is relatively small and increasing the difference from the neutral pressure for achieving suppression of vehicular pitching when the pitching magnitude is relatively large. The shown embodiment also achieves satisfactorily high level pitching stabilization without causing substantial degradation of the riding comfort.

It should be appreciated that though the shown embodiment adjusts the control gain depending upon the magnitude of lateral acceleration, it is possible to adjust the control gain depending upon magnitude of the longitudinal acceleration or both of the lateral and longitudinal accelerations. In addition, though the shown embodiment varies the control gain depending upon magnitude of lateral acceleration, it is also possible to introduce vehicular speed dependent feature, as shown in FIG. 6. Namely, in the example of FIG. 6, gradient of variation of the control gain depending upon the lateral acceleration, is varied depending upon the vehicle speed. By introduction of vehicular speed dependent feature in derivation of the control gain, further higher precise level of suspension control can be achieved. As can be seen from FIG. 6, it may be possible to preliminarily set a plurality of mutually different variation characteristics for selecting one of them depending upon the vehicle speed.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

Namely, though the shown embodiment is directed to the hydraulic active suspension system, the invention may be applicable for pneumatic or hydropneumatic active suspension systems. Furthermore, the shown embodiment employs a digital circuit for processing data for deriving control signals, the control circuit may be constructed as analog circuit. In the analog circuit, a variable gain amplifier may be employed for adjusting the control gain depending upon the lateral and/or longitudinal accelerations.

What is claimed is:

1. An active suspension system comprising:
   a suspension system disposed between a vehicular body and a road wheel, said suspension system including a variable pressure working chamber for generating damping force against relative displacement between the vehicular body and the road wheel;
   a hydraulic system connected to said working chamber for adjusting fluid pressure therein, said hydraulic system including a pressure control valve for controlling introduction and draining of pressurized fluid in said working chamber for adjusting the fluid pressure in said working chamber;

a first sensor for monitoring vertical acceleration at said suspension system for producing a first acceleration indicative data;

a second sensor for monitoring acceleration exerted in a direction transverse to vertical axis for producing a second acceleration indicative data; and a control means for receiving said first acceleration indicative data for deriving a vertical speed indicative data, deriving a control gain on the basis of said second acceleration indicative data, deriving a desired fluid pressure in said working chamber on the basis of said vertical speed indicative data and said control gain, and deriving a control signal for controlling position of said pressure control valve for adjusting the fluid pressure in said working chamber toward said desired fluid pressure.

2. An active suspension system as set forth in claim 1, wherein said second sensor monitors a lateral acceleration for producing said second acceleration indicative data representative thereof.

3. An active suspension system as set forth in claim 1, wherein said control means increases said control gain according to increasing of said second acceleration signal.

4. An active suspension system as set forth in claim 3, wherein said control means maintains said control gain constant at a predetermined minimum value when said second acceleration signal is maintained smaller than a predetermined value.

5. An active suspension system as set forth in claim 3, which further comprises a third sensor for monitoring vehicle speed to produce a vehicle speed data, and said control means varies increasing rate of said control gain according to increasing of said second acceleration data, depending upon said vehicle speed data.

6. An active suspension system as set forth in claim 5, wherein said control means is set a plurality of variation characteristics of said control gain and selects one of the variation characteristics depending upon the vehicle speed data.

7. An active suspension system comprising:

a suspension system disposed between a vehicular body and a road wheel, said suspension system including a variable pressure working chamber for generating damping force against relative displacement between the vehicular body and the road wheel;

a hydraulic system connected to said working chamber for adjusting fluid pressure therein, said hydraulic system including a pressure control valve for controlling introduction and draining of pressurized fluid in said working chamber for adjusting the fluid pressure in said working chamber;

a first sensor for monitoring vertical acceleration at said suspension system for producing a first acceleration indicative data;

a second sensor for monitoring acceleration exerted in a direction transverse to vertical axis for producing a second acceleration indicative data; and a control means for receiving said first acceleration indicative data for deriving a vertical speed indicative data, deriving a control gain on the basis of said second acceleration indicative data, deriving a vertical motion dependent pressure adjusting value representative of offset of pressure from a predetermined neutral pressure, and deriving a control signal for controlling position of said pressure control valve on the basis of said vertical motion dependent pressure adjusting value.

8. An active suspension system as set forth in claim 7, wherein said control means further deriving an attitude change dependent pressure adjusting value and derives said control signal on the basis of sum of said vertical motion dependent pressure adjusting value and said attitude change dependent pressure adjusting value.

9. An active suspension system as set forth in claim 8, wherein said second sensor monitors a lateral acceleration for producing said second acceleration indicative data representative thereof, and said control means derives a first attitude change dependent pressure adjusting value depending upon the magnitude of lateral acceleration.

10. An active suspension system as set forth in claim 9, which further comprises a third sensor for monitoring longitudinal acceleration for producing a third acceleration indicative data, said control means derives a second attitude change dependent pressure adjusting value depending upon longitudinal acceleration, and said control signal on the basis of a sum of said vertical motion dependent pressure adjusting value, said first attitude change dependent pressure adjusting value and said second attitude change dependent pressure adjusting value.

11. An active suspension control system as set forth in claim 9, wherein said control means increases said control gain according to increasing of said second acceleration data.

12. An active suspension system as set forth in claim 11, wherein said control means maintains said control gain constant at a predetermined minimum value when said second acceleration signal is maintained smaller than a predetermined value.

13. An active suspension system as set forth in claim 12, which further comprises a third sensor for monitoring vehicle speed to produce a vehicle speed data, and said control means varies increasing rate of said control gain according to increasing of said second acceleration data, depending upon said vehicle speed data.

14. An active suspension system as set forth in claim 13, wherein said control means is set a plurality of variation characteristics of said control gain and selects one of the variation characteristics depending upon the vehicle speed data.

* * * * *